(12) United States Patent
Prentice et al.

(10) Patent No.: US 8,792,869 B2
(45) Date of Patent: Jul. 29, 2014

(54) METHOD AND APPARATUS FOR USING PROXIMITY SENSING FOR AUGMENTED REALITY GAMING

(75) Inventors: Adrian J. Prentice, San Diego, CA (US); Anthony G. Persaud, San Diego, CA (US); George Joseph, San Diego, CA (US); Mark R. Storch, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 13/274,585

(22) Filed: Oct. 17, 2011

(65) Prior Publication Data

US 2012/0296453 A1 Nov. 22, 2012

Related U.S. Application Data

(60) Provisional application No. 61/487,516, filed on May 18, 2011.

(51) Int. Cl.
*H04M 3/42* (2006.01)
*G01S 5/14* (2006.01)

(52) U.S. Cl.
CPC ..................... *G01S 5/14* (2013.01)
USPC ................... 455/414.2; 455/41.2; 455/456.1; 700/245

(58) Field of Classification Search
CPC ..... H04W 4/02; H04L 29/08657; G01S 5/14; G06F 3/011
USPC .............. 455/414.2, 41.2, 41.1, 414.1, 456.1; 700/245, 250, 253
See application file for complete search history.

(56) References Cited

U.S. PATENT DOCUMENTS

| 5,435,031 | A * | 7/1995 | Minami et al. ................... 15/1.7 |
| 5,507,058 | A * | 4/1996 | Minami et al. ................... 15/1.7 |
| 7,000,469 | B2 * | 2/2006 | Foxlin et al. .................... 73/488 |
| 7,539,533 | B2 | 5/2009 | Tran |
| 8,214,081 | B2 * | 7/2012 | Choi et al. ..................... 700/250 |
| 8,408,360 | B2 * | 4/2013 | Postma ........................... 182/18 |

(Continued)

FOREIGN PATENT DOCUMENTS

| EP | 2141632 A2 | 1/2010 |
| WO | 2004081602 A2 | 9/2004 |
| WO | 2007147012 A2 | 12/2007 |

OTHER PUBLICATIONS

International Search Report and Written Opinion—PCT/US2012/027593—ISA/EPO—Jun. 19, 2012.

(Continued)

*Primary Examiner* — Minh D Dao
(74) *Attorney, Agent, or Firm* — Paul S. Holdaway

(57) ABSTRACT

Apparatuses for wireless communication is disclosed that includes a receiver configured to receive ranging information from at least one of one or more sensors arranged with an object and one or more sensors remote from the object; and a processing system configured to track the object with respect to the one or more sensors remote from the object based on the ranging information. A method for wireless communication is disclosed that includes receiving ranging information from at least one of one or more sensors arranged with an object and one or more sensors remote from the object; and tracking the object with respect to the one or more sensors remote from the object based on the ranging information.

37 Claims, 9 Drawing Sheets

(56) References Cited

U.S. PATENT DOCUMENTS

| | | | |
|---|---|---|---|
| 2008/0017433 A1* | 1/2008 | Taft | 180/252 |
| 2010/0030378 A1* | 2/2010 | Choi et al. | 700/245 |
| 2010/0164862 A1 | 7/2010 | Sullivan et al. | |
| 2010/0184564 A1 | 7/2010 | Molyneux et al. | |
| 2010/0304931 A1 | 12/2010 | Stumpf | |
| 2011/0049023 A1* | 3/2011 | Hui | 210/91 |
| 2012/0256494 A1* | 10/2012 | Kesler et al. | 307/104 |
| 2013/0256042 A1* | 10/2013 | Rudakevych | 180/9.32 |

OTHER PUBLICATIONS

Aylward, et al., "A Compact, High-Speed, Wearable Sensor Network for Biomotion Capture and Interactive Media," IPSN '07, Apr. 25-27, 2007, Cambridge, MA, pp. 380-389.

Cheng, et al., "Analysis of Wireless Inertial Sensing for Athlete Coaching Support," IEEE Global Telecommunications Conference, 2008. IEEE GLOBECOM 2008, pp. 1-5.

* cited by examiner

METHOD AND APPARATUS FOR USING PROXIMITY SENSING FOR AUGMENTED REALITY GAMING

PRIORITY CLAIM

This application claims the benefit of U.S. Provisional Patent application Ser. No. 61/487,516, entitled "METHOD AND APPARATUS FOR USING PROXIMITY SENSING FOR AUGMENTED REALITY GAMING" which was filed May 18, 2011. The entirety of the aforementioned application is herein incorporated by reference.

BACKGROUND

1. Field

Certain aspects of the disclosure set forth herein generally relate to motion capture and, more particularly, to a method and apparatus for using proximity sensing for augmented reality gaming.

2. Background

Body tracking systems have been progressing on two different fronts. First, professional grade "motion capture" systems are available that can capture motion of an actor, athlete, player, etc. with high fidelity for use by movie and game studios, for example. These systems are typically high-cost, and thus not suitable for consumer grade applications. Second, consumer grade game controllers have progressed recently from being based on button or mechanical switches, to being based on player movement detection. Since these are consumer products, the technology is much lower cost, and in general, much lower in the quality of performance as well. For example, in the Nintendo WHO system, low-cost inertial sensors can detect hand motion that is used to control the game play. Issues with the accuracy of this type of game control have driven the rise in use of camera-based motion capture. For example, the Sony PlayStation® Move system can use a camera to track a spherical feature on the handheld game controller; this input can be combined with inertial sensor data to detect motion. Furthermore, the Microsoft Kinect® system is capable of removing the controller entirely and can use combination of traditional and depth detecting cameras to detect the body motion utilizing the camera alone.

There are several areas of concern with current motion capture systems. First, these systems suffer from performance issues that limit the types of motions that are detectable and that limit the types of games and user interactions that are possible. For example, camera systems only work on things that are in the field of view of the camera, and that are not blocked by objects or people. Second, camera augmentation systems are constrained to operating in an environment where a stationary camera can be mounted and installed—most commonly in a living room or a den. Further, current camera systems used for human body motion capturing are neither scalable nor capable of being used effectively in outdoor environments due to several limiting factors including, but not limited to, occlusion, frequency interference, and weather/lighting conditions. In addition, the use of large two dimensional (2D) touch displays for manipulating three dimensional (3D) objects or controlling vehicles is not highly effective and intuitive without the use of human gesture recognition.

Therefore, technology advances are desired to enable improvements in body tracking performance and to enable these systems to go wherever the user wants to go, whether these systems are used in a commercial or consumer application. Example commercial applications include accurate motion capture for gesture recognition in a variety of environments. Example consumer applications include mobile gaming between one or more players, and sports performance tracking and training, whether outdoors or in a gym. Further, there are many more potential applications for mobile body tracking that may emerge if such tracking technology is available at reasonable prices and sufficient performance levels.

SUMMARY

In one aspect of the disclosure, an apparatus for wireless communication includes a receiver configured to receive ranging information from at least one of one or more sensors arranged with an object and one or more sensors remote from the object; and a processing system configured to track the object with respect to the one or more sensors remote from the object based on the ranging information.

In another aspect of the disclosure, an apparatus for wireless communication includes means for receiving ranging information from at least one of one or more sensors arranged with an object and one or more sensors remote from the object; and means for tracking the object with respect to the one or more sensors remote from the object based on the ranging information.

In yet another aspect of the disclosure, a method for wireless communication comprises receiving ranging information from at least one of one or more sensors arranged with an object and one or more sensors remote from the object; and tracking the object with respect to the one or more sensors remote from the object based on the ranging information.

In yet another aspect of the disclosure, a computer program product for wireless communication includes a computer-readable medium comprising instructions executable for receiving ranging information from at least one of one or more sensors arranged with an object and one or more sensors remote from the object; and tracking the object with respect to the one or more sensors remote from the object based on the ranging information.

In yet another aspect of the disclosure, a gaming system includes an antenna; and a processing system configured to receive ranging information via the antenna from at least one of one or more sensors arranged with an object and one or more sensors remote from the object; and track the object with respect to the one or more sensors remote from the object based on the ranging information.

BRIEF DESCRIPTION OF THE DRAWINGS

So that the manner in which the above-recited features of the disclosure set forth herein can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
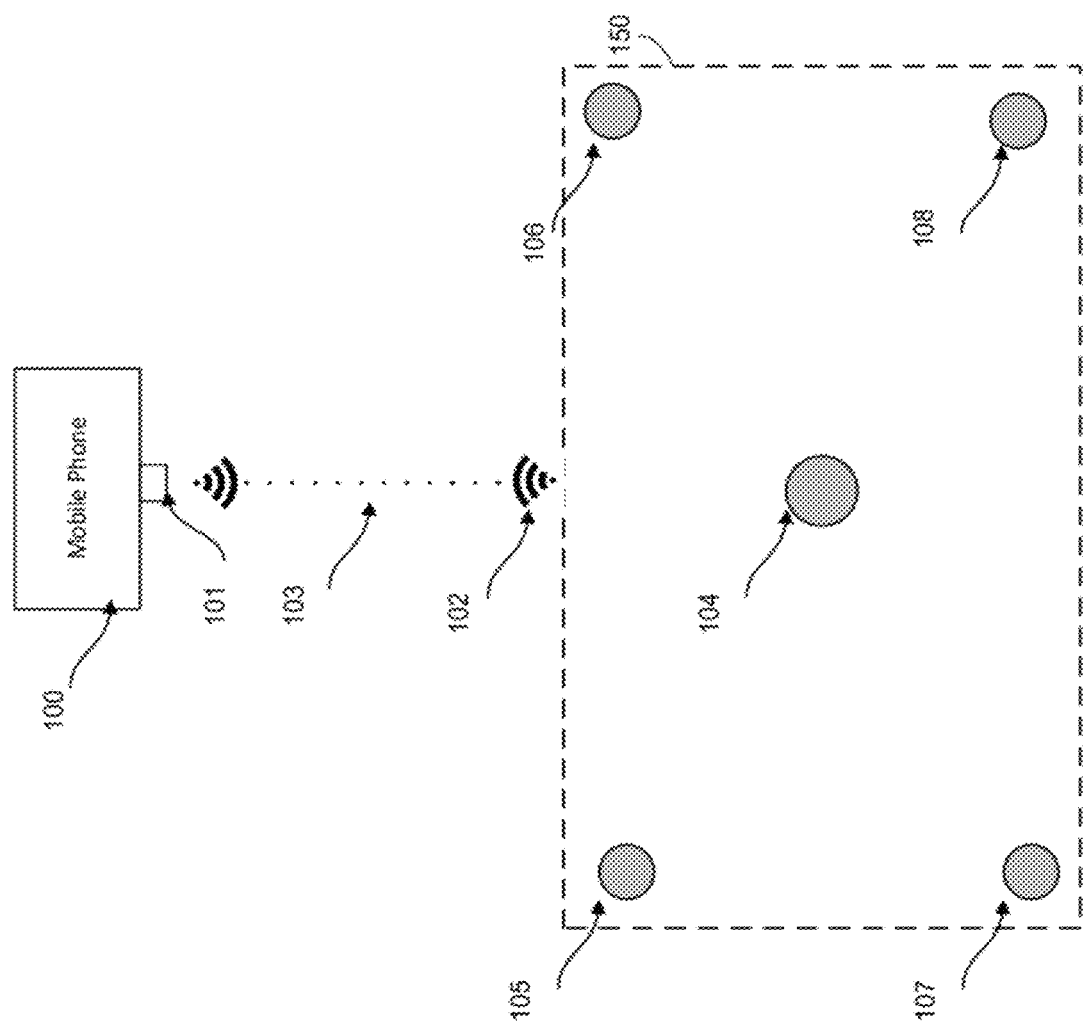
FIG. 1 is a diagram illustrating an example of a proximity sensor mesh utilizing proximity sensors to enable human motion detection in accordance with certain aspects of the disclosure set forth herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Further, although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Next generation gaming platforms now use different techniques to capture human motion and position to improve on game mechanics and design. As the gaming industry continues to evolve, new types of interactive games have become increasingly popular among the mass market. Some of these types of games require players to utilize their whole body to perform specific gestures in order to control game avatars or provide input as part of a game mechanic. One popular game genre is exercise games such as EA Sports Active. Current exercise games utilize camera-based techniques for capturing the motion of players as they perform different exercises (Tai Chi, Yoga, sit-ups, etc). However, several factors, including but not limited to occlusion due to furniture and clothing, interference, minimal accuracy of motions and constant camera recalibration do not provide for an ideal game play. Further, existing games are only focused on indoor settings/activities because mobile devices have heretobefore not had the processing power or hardware to support these type of applications. However, given that many mobile phones as well as other mobile devices have included significant advances in technology; new gaming applications are now being explored for outdoor activities and games. Viewed in another way, current outdoor activities have not been modernized with mobile technology to improve the user game experience. As next generation gaming evolves in the living room with new technology such as the Microsoft KINECT™, PlayStation Move™ and Wii Remote™, outdoor gaming activities can benefit from similarly added technology. While other sensors may have been used for specific athletes for highly focused competitive use cases, a low power and low cost solution for creating consumer grade sensors to enhance these outdoor gaming experiences is desirable.

The proposed system integrates ranging and proximity sensors in outdoor gaming equipment to utilize the proximity data recorded from a "run" or "session" such during skiing, climbing, biking, etc. for personal improvement, competitiveness and/or social gaming. In one approach, sensors would be placed on or integrated with the particular user equipment. For example, in skiing, the sensors would be integrated near the boots and the end of the ski poles and in the flag pole infrastructure at a ski park. A central node, worn by the consumer, would continue to record the range data and time during a particular "run" and provide an analysis of the data at the end.

In general, the disclosed system utilizes a proximity sensor mesh, which is an area with specifically placed set of proximity sensors capable of measuring distances to the sensors worn by the user. As the user performs motions with his/her body, the mesh creates a virtual area in which the sensors can accurately motion capture user movements. In one aspect of the system set forth herein, the sensor mesh contains a plurality of proximity sensors. In addition, wearable proximity sensors are worn by the user. Both sets of sensors create a positioning mesh network that allows every node to determine the position of every node worn by the user, without the need for calibration, over a period of time. In one aspect of the determination, the positions may be determined using triangulation. Further, using specific algorithms, sensor motions and path over time may be recognized. Because of the higher level of accuracy, any exercise game can inform the user on whether they are performing the movements properly. The sensor mesh can also be taken to gyms to be used with other mobile applications. The user sensors can be included in exercise peripherals such as ski/snowboarding boots, climbing and other shoes, ankle/wrist bands, gloves, waist bands, etc. The proximity mesh could be extended to be "ad-hoc", where sensors can be placed on the ground to create the "live" area dynamically. Processing of the data can happen either in a central node, all nodes or a mobile device such as the mobile phone of the user.

The disclosed approach is not affected by external interference since the proximity sensors described herein uses a high frequency band not used by Wi-Fi or cell phones. Further, the proximity sensors described herein utilize extremely low power, which allow for longer external use with battery systems. The use of multiple channels may provide ample transfer rate for the most data intensive proximity data.

FIG. 1 illustrates an example of a proximity sensor mesh 150 that may be used for an augmented reality gaming system. The proximity sensor mesh 150 includes special integrated ranging sensors. As shown in the figure, the proximity sensor mesh 150 includes a plurality of proximity sensors 104 to 108. Although as illustrated the proximity sensor mesh 150 is shown to be placed in a rectangular array with four nodes—one placed in each corner and a center node at the center of the mesh, in various implementations there may be any number of proximity sensors placed in any arrangement. Thus, the proximity sensors may be affixed to surfaces to be monitored in any pattern. For example, a large number of sensors may need to be used to cover large areas, such as a mountain-side. The arrangement may cover any sized and shaped area, as long as a sufficient number of proximity sensors are used. Each of these proximity sensors, also referred to as nodes, may range with another node. As further described herein, each of the node may communicate with one or more nodes worn/held by, or associated with a user. In one aspect of the proximity sensor mesh 150, the plurality of proximity sensors 104 to 108 may be simply placed on the ground without being arranged in any predetermined pattern. Each of them would then determine their positions relative to each other using ranging.

The system includes a receiver module such as a mobile phone 100 that receives proximity data provided wirelessly using a wireless receiver 101 and that can generate performance information based on the proximity data. The proximity data that is transmitted by a wireless transmitter 102 from the proximity sensor mesh 150 to the wireless receiver 101 is encapsulated in a wireless protocol 103. The wireless transmitter 102 is used to abstract one or more transmitters that may be implemented by the proximity sensor mesh 150 because, in one approach, the proximity data from multiple proximity sensors in the proximity sensor mesh 150 may be grouped together and communicated using a single wireless transmitter. In another approach, the proximity data may be communicated from each proximity sensor in the proximity sensor mesh 150. As further described herein, coupled with proximity sensors worn, carried by, or otherwise associated with a user, the proximity sensors in the proximity sensor mesh 150 may be used to track a user's movement through the area monitored by the proximity sensor mesh 150.

Figure 2:
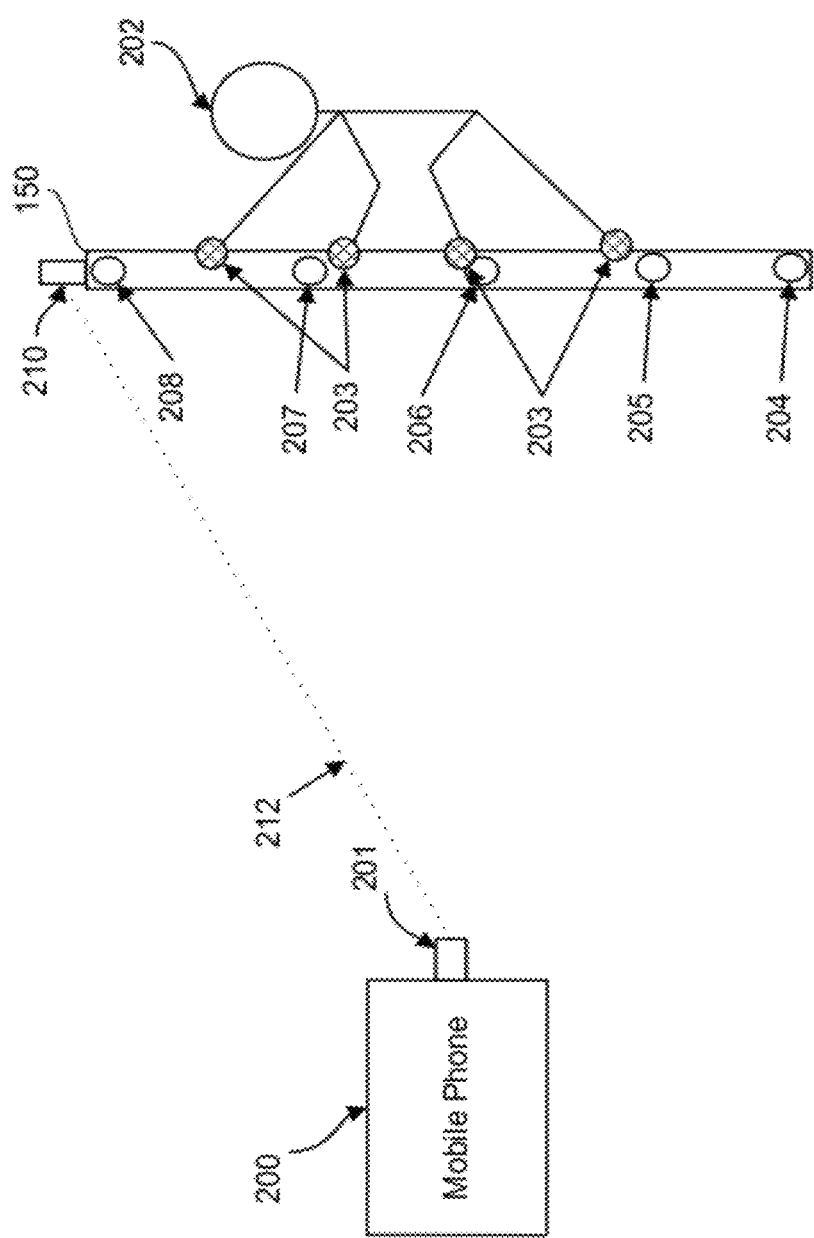
FIG. 2 is a diagram illustrating an example of a system for motion capture and augmented reality gaming using the proximity sensor mesh of FIG. 1.

FIG. 2 illustrates the use of the proximity sensor mesh 150 to provide proximity information to a mobile phone 200 to be used in an augmented reality gaming application. The mobile phone 200 includes a wireless receiver 201 for receiving proximity and gesture data that is wirelessly transmitted by each proximity sensors in the proximity sensor mesh 150 and a plurality of proximity sensors 203 worn by a user 202. The plurality of proximity sensors 203 may be worn on different parts of the human body of the user 202 and mutually communicate as being part of, and will be referred to herein, as a BAN. These sensors communicate with the proximity sensors on the proximity sensor mesh 150, such as sensors 204-208 that correspond to sensors 104-108 of FIG. 1, respectively, to provide accurate motion capture of the user's movement. The BAN and the proximity sensor mesh 150 may be viewed as a wireless communication system where various wireless nodes communicate using either orthogonal multiplexing scheme or a single carrier transmission. Thus, each body and proximity sensor mesh-mounted node may comprise a wireless sensor that senses (acquires) one or more signals associated with a movement of the user's body and is configured for communicating the signals to the mobile phone 200. The sensors on the proximity sensor mesh 150 are used for better estimation of the user's movements and body positions in 3D space. In one implementation, to achieve the estimation, linear distance calculations may be performed for each proximity sensor 203 worn by the user 202 and each proximity sensor on the proximity sensor mesh 150. The calculations are also performed over time. In one aspect, the wireless nodes described herein may operate in accordance with compressed sensing (CS), where an acquisition rate may be smaller than the Nyquist rate of a signal being acquired.

To simply the discussion, a wireless transmitter 210 that represents the wireless transmitter for each sensor on the proximity sensor mesh 150 and the plurality of proximity sensors 203 on the user 202 will be used in the description. The mobile phone 200 will receive the ranging and proximity data from the wireless transmitter 210, encoded using a protocol 212, and process the information from one or more sensors to estimate or determine movement information of the user 202 through the area defined by the proximity sensor mesh 150. The data received from the wireless transmitter 210 may also contain processed information, such as movement tracking and timing information detected from the movements of the body of the user as described herein. Thus, in one aspect, as the user 202 moves through the area monitored by the proximity sensor mesh 150, each sensor 203 may communicate with one or more sensors on the proximity sensor mesh 150 so that the ranging information between each sensor is recorded and the movement of the user 203 may be tracked over time. This information may then be processed and stored by the mobile phone 200 and used for reality augmented gaming applications as described herein.

Figure 3:
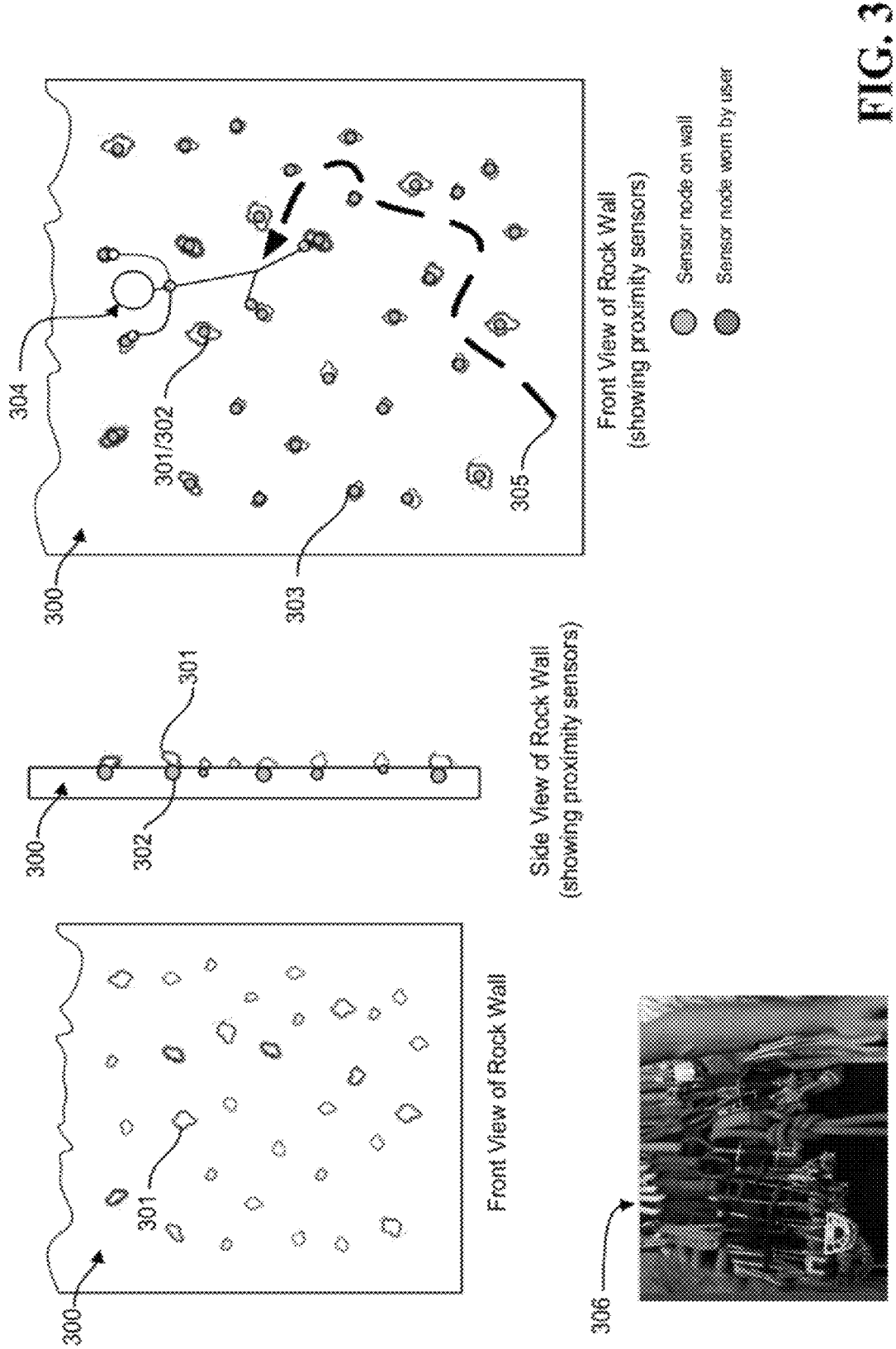
FIG. 3 is a diagram illustrating an aspect of the use of the system for augmented reality gaming in FIG. 2 with respect to a rock climbing application in accordance with certain aspects of the disclosure set forth herein.

FIG. 3 illustrates an example of the use of the augmented reality gaming system for a rock climbing application where a rock climbing wall 300 include a plurality of climbing features such as a climbing feature 301 attached to the rock climbing wall 300 onto which users can grab as they climb. The rock climbing wall 300 includes a plurality of proximity sensors such as a proximity sensor 302 mounted to the climbing features on the wall. A front view of a climbing feature with proximity sensor 303 is also shown. Thus, as a climber 304 such as the user 202 moves on rock climbing wall 300, the proximity sensors on the climber 304 will interact with the proximity sensors on the rock climbing wall 300 so that a path 305 taken by the climber 304 may be tracked. In one approach, the tracking of the path 305 may be determined based on the proximity data generated between each of the proximity sensors worn by the climber 304, such as the plurality of proximity sensors 203, and the proximity sensors on the rock climbing wall 300. In addition, proximity sensors may be embedded in or attached to such equipment such as climbing hooks 306. Although a rock climbing wall is used as an example, it should be apparent that the system may be used for a variety of other sports.

Figure 4:
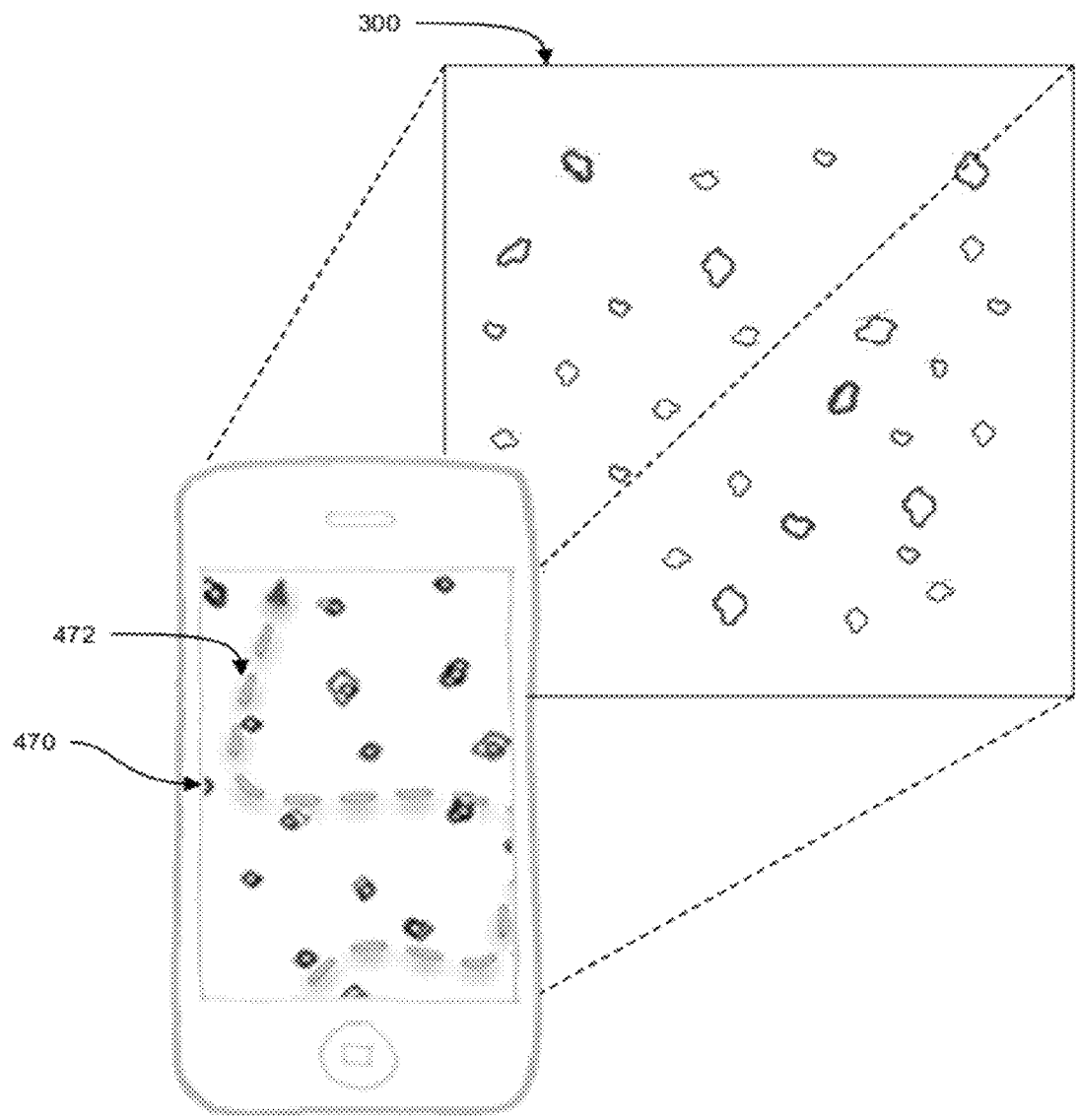
FIG. 4 is a diagram illustrating another aspect of the use of the system for augmented reality gaming in FIG. 2 with respect to the rock climbing application in accordance with certain aspects of the disclosure set forth herein.

FIG. 4 illustrates another aspect of the example of the rock climbing wall augmented reality gaming of FIG. 3 where a path 472 of a climber may be displayed on a screen 470 of a mobile phone device such as mobile phone 200. In competition, other climbers may try to match the same path taken by the climber and the path image may be superimposed on the images of the climber captured via a camera or other imaging device on the mobile phone in real-time to visually gauge the performance of each climber. Performance information may be captured along with the motion tracking, such as route information for a route taken by the climber, speed information, and other metrics relevant to the climb. In general, performance information may be captured related to the particular sport to which the system is being applied. For example, if the system is being applied to a skiing racing competition where a skier has to pass through a set of slalom gates, then the tracked information may include whether a particular skier has hit all the gates. In this example, each pair of poles that define a gate may include sensors, and the system may determine if the sensor(s) worn by or associated with (if the sensors are on the ski equipment) the skier has passed through the gate or around it. In another example, where a user is involved in a race around a track or course, whether it is an automobile, horse, marathon, etc.; lap times and racing/course routes may be captured.

Figure 5:
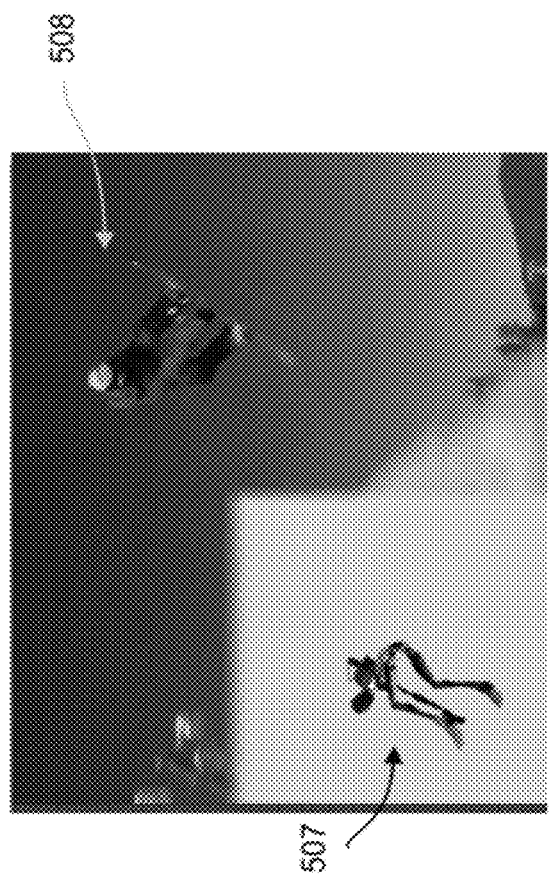
FIG. 5 is a diagram illustrating yet another aspect of the use of the system for augmented reality gaming in FIG. 2 for a snowboarding augmented reality application in accordance with certain aspects of the disclosure set forth herein.

FIG. 5 illustrates another aspect of proximity sensing and augmented reality gaming where an avatar 507 that is a motion capture avatar representative of a snowboarder 508 may be created using sensors that have been placed on the snowboarder 508, the snowboard, and the terrain over which the snowboarder 508 is traversing.

Figure 6:
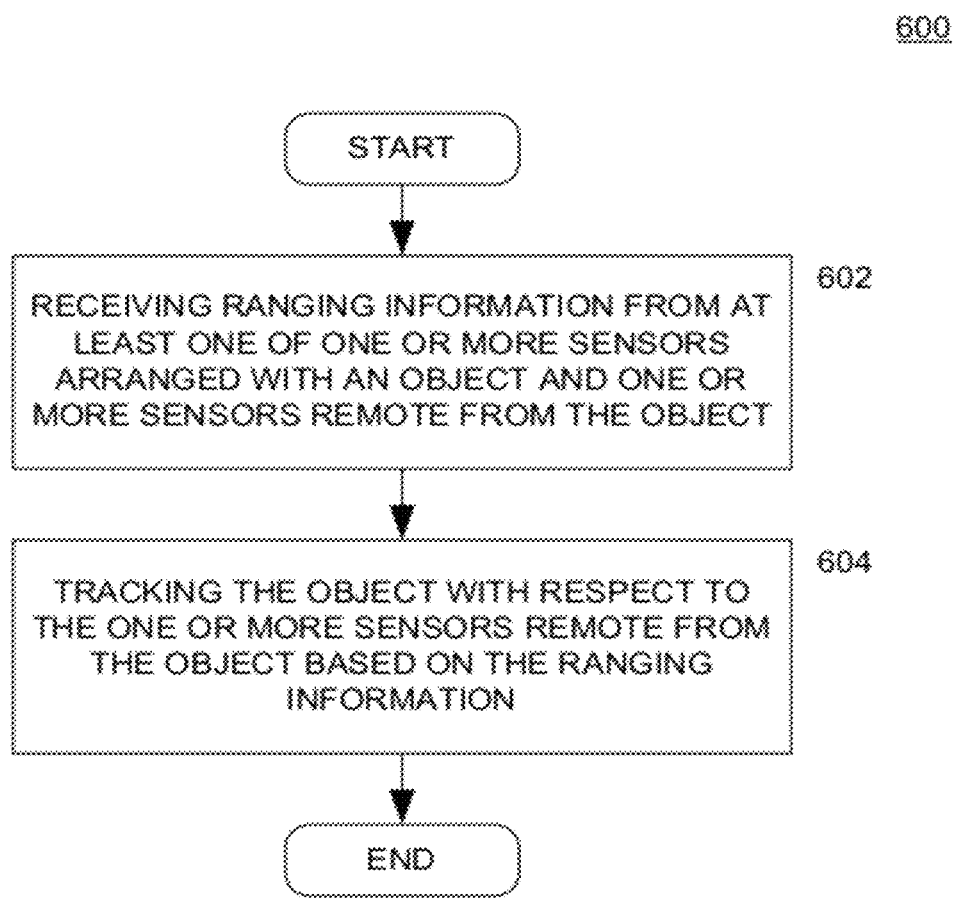
FIG. 6 is a flow diagram illustrating an augmented reality gaming process in accordance with certain aspects of the disclosure set forth herein.

FIG. 6 illustrates an augmented gaming system operation process 600 where, at 602, receiving ranging information from at least one of one or more sensors arranged with an object and one or more sensors remote from the object. At 604, tracking the object with respect to the one or more sensors remote from the object based on the ranging information.

Figure 7:
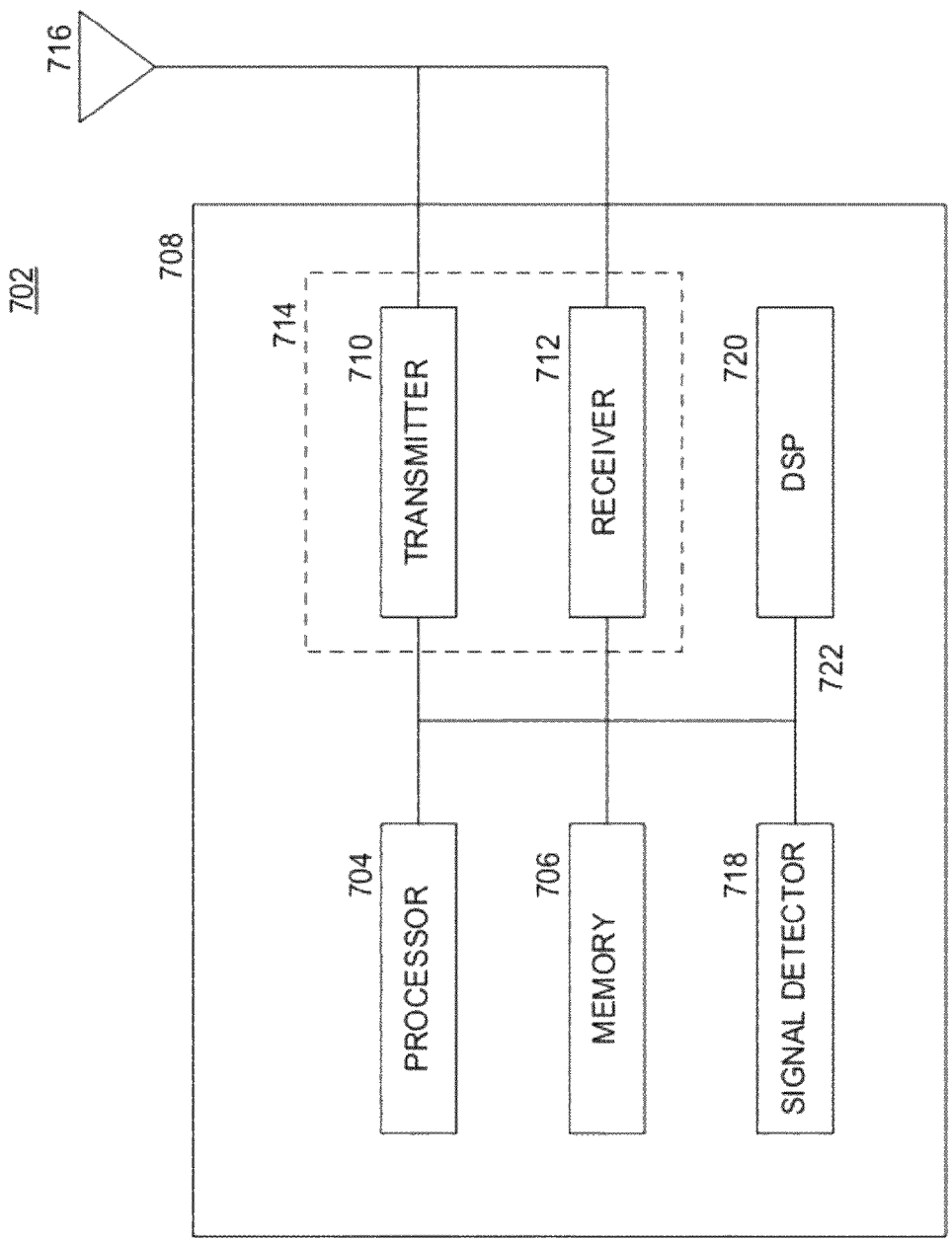
FIG. 7 is a diagram illustrating various components that may be utilized in a wireless device of the BAN in accordance with certain aspects of the disclosure set forth herein.
Figure 8:
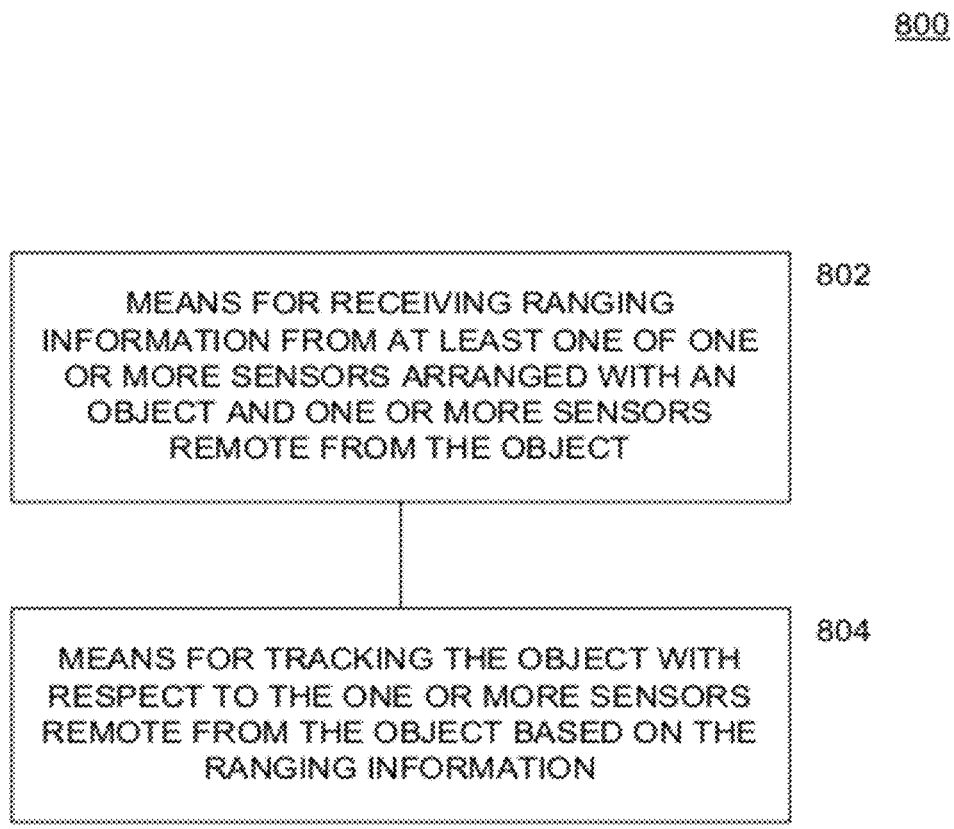
FIG. 8 is a diagram illustrating example means capable of performing the operations shown in FIG. 6.

FIG. 7 illustrates various components that may be utilized in a wireless device (wireless node) 700 that may be employed within the system set forth herein. The wireless device 700 is an example of a device that may be configured to implement the various methods described herein. The wireless device 700 may be used to implement any one of the proximity sensor 104 and plurality of proximity sensors 105 in the proximity sensor mesh 150, or the plurality of proximity sensor 203 worn by the user 202.

The wireless device 700 may include a processor 704 which controls operation of the wireless device 700. The processor 704 may also be referred to as a central processing unit (CPU). Memory 706, which may include both read-only memory (ROM) and random access memory (RAM) or any other type of memory, provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein.

The wireless device 700 may also include a housing 708 that may include a transmitter 710 and a receiver 712 to allow transmission and reception of data between the wireless device 700 and a remote location. The transmitter 710 and receiver 712 may be combined into a transceiver 714. An antenna 716 may be attached to the housing 708 and electrically coupled to the transceiver 714. The wireless device 700 may also include (not shown) multiple transmitters, multiple receivers, multiple transceivers, and/or multiple antennas.

The wireless device 700 may also include a signal detector 718 that may be used in an effort to detect and quantify the level of signals received by the transceiver 714. The signal detector 718 may detect such signals as total energy, energy per subcarrier per symbol, power spectral density and other signals. The wireless device 700 may also include a digital signal processor (DSP) 720 for use in processing signals.

The various components of the wireless device 700 may be coupled together by a bus system 722, which may include a power bus, a control signal bus, and a status signal bus in addition to a data bus.

In many current systems, mobile body tracking may employ inertial sensors mounted to a body associated with the BAN. These systems may be limited in that they suffer from limited dynamic range and from the estimator drifts that are common with inertial sensors. Also, acceptable body motion estimation may require a large number of sensor nodes (e.g., a minimum of 15), since each articulated part of the body may require a full orientation estimate. Further, existing systems may require the performance of industrial grade inertial sensors, increasing cost, etc. For many applications, ease of use and cost are typically of the utmost importance. Therefore, it is desirable to develop new methods for reducing the number of nodes required for mobile body tracking while maintaining the required accuracy.

In various aspects of the disclosure set forth herein, ranging is referred to in various implementations. As used herein, ranging is a sensing mechanism that determines the distance between two ranging detection equipped nodes such as two proximity sensors. The ranges may be combined with measurements from other sensors such as inertial sensors to correct for errors and provide the ability to estimate drift components in the inertial sensors. According to certain aspects, a set of body mounted nodes may emit transmissions that can be detected with one or more stationary ground reference nodes. The reference nodes may have known position, and may be time synchronized to within a fraction of a nanosecond. However, having to rely on solutions utilizing stationary ground reference nodes may not be practical for many applications due its complex setup requirements. Therefore, further innovation may be desired.

Certain aspects of the disclosure set forth herein support various mechanisms that allow a system to overcome the limitations of previous approaches and enable products that have the characteristics required for a variety of applications.

It should be noted that while the term "body" is used herein, the description can also apply to capturing poses of machines such as robots. Also, the presented techniques may apply to capturing the pose of props in the activity, such as swords/shields, skateboards, racquets/clubs/bats.

As discussed herein, inertial sensors as described herein include such sensors as accelerometers, gyros or inertial measurement units (IMU). IMUS are a combination of both accelerometers and gyros. The operation and functioning of these sensors are familiar to those of ordinary skill in the art.

Ranging is a sensing mechanism that determines the distance between two equipped nodes. The ranges may be combined with inertial sensor measurements into the body motion estimator to correct for errors and provide the ability to estimate drift components in the inertial sensors. According to certain aspects, a set of body mounted nodes may emit transmissions that can be detected with one or more stationary ground reference nodes. The reference nodes may have known position, and may be time synchronized to within a fraction of a nanosecond. However, as noted previously, this system may not be practical for a consumer-grade product due its complex setup requirements. Therefore, further innovation may be desired.

In one aspect of the disclosed system, range information associated with the body mounted nodes may be produced based on a signal round-trip-time rather than a time-of-arrival. This may eliminate any clock uncertainty between the two nodes from the range estimate, and thus may remove the requirement to synchronize nodes, which may dramatically simplify the setup. Further, the proposed approach makes all nodes essentially the same, since there is no concept of "synchronized nodes" versus "unsynchronized nodes".

The proposed approach may utilize ranges between any two nodes, including between different body worn nodes. These ranges may be combined with inertial sensor data and with constraints provided by a kinematic body model to estimate body pose and motion. Whereas the previous system performed ranging only from a body node to a fixed node, removing the time synch requirement may enable to perform ranging between any two nodes. These additional ranges may be very valuable in a motion tracking estimator due to the additional range data available, and also due to the direct sensing of body relative position. Ranges between nodes on different bodies may be also useful for determining relative position and pose between the bodies.

With the use of high-accuracy round trip time ranges and ranges between nodes both on and off the body, the number and quality of the inertial sensors may be reduced. Reducing the number of nodes may make usage much simpler, and reducing the required accuracy of the inertial sensors may reduce cost. Both of these improvements can be crucial in producing a system suitable for consumer products.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, FIG. 6 illustrating an example of an apparatus 600 for augmented reality gaming. The apparatus 600 includes means configured for receiving ranging information from at least one of one or more sensors arranged with an object and one or more sensors remote from the object 602; and means for tracking the object with respect to the one or more sensors remote from the object based on the ranging information 604.

Further, in general, a means for sensing may include one or more proximity sensors such as proximity sensors 105, inertial sensors, or any combinations thereof. A means for transmitting may comprise a transmitter (e.g., the transmitter unit 710) and/or an antenna 716 illustrated in FIG. 7. Means for receiving may comprise a receiver (e.g., the receiver unit 712) and/or an antenna 716 illustrated in FIG. 7. Means for tracking, means for processing, means for determining, or means for using may comprise a processing system, which may include one or more processors, such as the processor 704 illustrated in FIG. 7.

Figure 9:
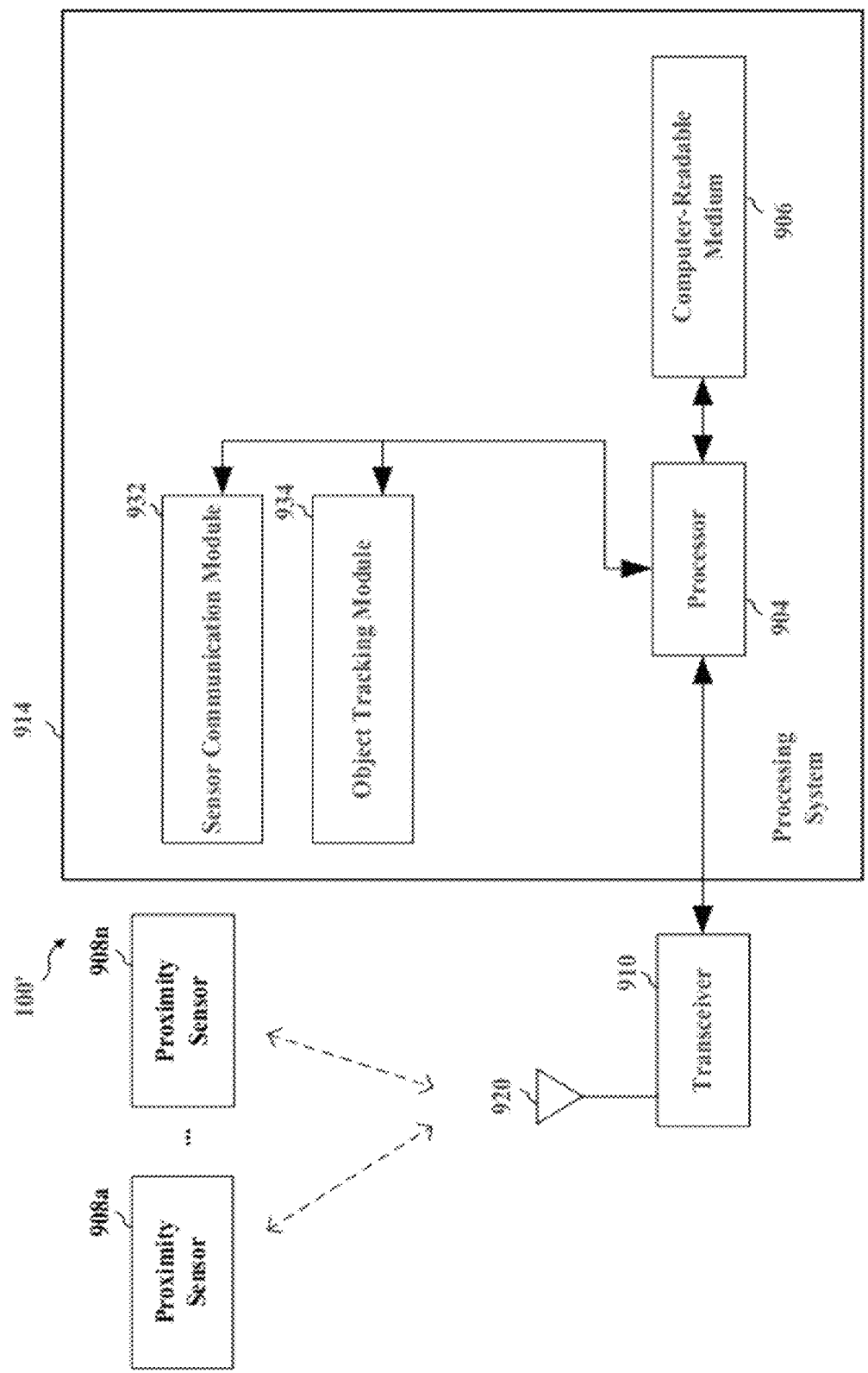
FIG. 9 is a diagram illustrating an example of a hardware implementation for an apparatus employing a processing system that may be implemented for using proximity sensing for augmented reality gaming.

FIG. 9 is a diagram illustrating an example of a hardware implementation for the mobile phone 100 or the mobile phone Error! Reference source not found.00 employing a processing system 914. The apparatus includes a processing system 914 coupled to a transceiver 910. The transceiver 910 is coupled to one or more antennas 920. The transceiver 910 provides a means for communicating with various other apparatus over a transmission medium. For example, the transceiver 910 may communicate with a plurality of proximity sensors 908a-908n, including such as those worn by the user 202 and those on the proximity sensor mesh 150 described with reference to FIGS. 1 and 2. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software.

The processing system further includes a sensor communication module 932 for receiving ranging information from at least one of one or more sensors, such as at least one portion of the plurality of proximity sensors 908a-908n, arranged with an object such as the user 202 and one or more sensors remote from the object, such as at least another portion of the plurality of proximity sensors 908a-908n. Thus, the at least one portion of the plurality of proximity sensors 908a-908n includes the plurality of proximity sensors 203 worn by a user 202, and the at least another portion of the plurality of proximity sensors 908a-908n that are remote from the object includes the sensors 204-208 on the proximity sensor mesh 150. The processing system further includes an object tracking module 934 for tracking the object with respect to the one or more sensors remote from the object based on the ranging information. The determined estimated motion of the surface may be stored in the processing system 914, such as in the computer-readable medium 906. The modules may be software modules running in the processor 904, resident/stored in the computer readable medium 906, one or more hardware modules coupled to the processor 904, or some combination thereof.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The various illustrative logical blocks, modules and circuits described in connection with the disclosure set forth herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The steps of a method or algorithm described in connection with the disclosure set forth herein may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

A processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As described herein, a wireless device/node in the disclosure set forth herein may include various components that perform functions based on signals that are transmitted by or received at the wireless device. A wireless device may also refer to a wearable wireless device. In some aspects the wearable wireless device may comprise a wireless headset or a wireless watch. For example, a wireless headset may include a transducer adapted to provide audio output based on data received via a receiver. A wireless watch may include a user interface adapted to provide an indication based on data received via a receiver. A wireless sensing device may include a sensor adapted to provide data to be transmitted via a transmitter.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 30 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 710 and receiver 712) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA") or so-called smart-phone, an entertainment device (e.g., a portable media device, including music and video players), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitoring device that may receive data from the medical or environment sensing device (e.g., a desktop, a mobile computer, etc.), a point-of-care device, a hearing aid, a set-top box, or any other suitable device. The monitoring device may also have access to data from different sensing devices via connection with a network.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communication comprising:
  a receiver configured to receive ranging information from at least one of one or more sensors arranged with an object and one or more sensors remote from the object, wherein the at least one or more sensors arranged with the object and the one or more sensors remote from the object provide the ranging information by defining a proximity sensor mesh; and
  a processing system configured to track the object with respect to the one or more sensors remote from the object based on the ranging information.

2. The apparatus of claim 1, wherein the processing system is further configured to track the object if the one or more sensors remote from the object are affixed to one or more surfaces.

3. The apparatus of claim 2, wherein at least one of the one or more surfaces is portable.

4. The apparatus of claim 1, wherein the one or more sensors remote from the object are affixed to one or more surfaces, and the processing system is further configured to track the object by determining one or more positions of the object with respect to the one or more surfaces.

5. The apparatus of claim 1, wherein the object comprises a human body.

6. The apparatus of claim 5, wherein the one or more sensors arranged with the object are affixed to different parts of the human body, and the processing system is further configured to determine movement of the different parts of the human body from the ranging information.

7. The apparatus of claim 1, wherein the object comprises a peripheral held or attached to a human body.

8. The apparatus of claim 1, wherein the processing system is further configured to track the object to generate performance information of the object.

9. The apparatus of claim 8, wherein the performance information comprises at least one of racing route, lap times or speed information.

10. An apparatus for wireless communication comprising:
    means for receiving ranging information from at least one of one or more sensors arranged with an object and one or more sensors remote from the object, wherein the at least one or more sensors arranged with the object and the one or more sensors remote from the object provide the ranging information by defining a proximity sensor mesh; and
    means for tracking the object with respect to the one or more sensors remote from the object based on the ranging information.

11. The apparatus of claim 10, wherein the means for tracking further comprises means for tracking the object if the one or more sensors remote from the object are affixed to one or more surfaces.

12. The apparatus of claim 11, wherein at least one of the one or more surfaces is portable.

13. The apparatus of claim 10, wherein the one or more sensors remote from the object are affixed to one or more surfaces, and the means for tracking further comprising means for tracking the object by determining one or more positions of the object with respect to the one or more surfaces.

14. The apparatus of claim 10, wherein the object comprises a human body.

15. The apparatus of claim 14, wherein the one or more sensors arranged with the object are affixed to different parts of the human body, and the apparatus further comprising means for determining movement of the different parts of the human body from the ranging information.

16. The apparatus of claim 10, wherein the object comprises a peripheral held or attached to a human body.

17. The apparatus of claim 10, wherein the means for tracking further comprises means for tracking the object to generate performance information of the object.

18. The apparatus of claim 17, wherein the performance information comprises at least one of racing route, lap times or speed information.

19. A method for wireless communication comprising:
    receiving ranging information from at least one of one or more sensors arranged with an object and one or more sensors remote from the object, wherein the at least one or more sensors arranged with the object and the one or more sensors remote from the object provide the ranging information by defining a proximity sensor mesh; and
    tracking the object with respect to the one or more sensors remote from the object based on the ranging information.

20. The method of claim 19, further comprising tracking the object if the one or more sensors remote from the object are affixed to one or more surfaces.

21. The method of claim 20, wherein at least one of the one or more surfaces is portable.

22. The method of claim 19, wherein the one or more sensors remote from the object are affixed to one or more surfaces, and further comprising tracking the object by determining one or more positions of the object with respect to the one or more surfaces.

23. The method of claim 19, wherein the object comprises a human body.

24. The method of claim 23, wherein the one or more sensors arranged with the object are affixed to different parts of the human body, and the method further comprises determining movement of the different parts of the human body from the ranging information.

25. The method of claim 19, wherein the object comprises a peripheral held or attached to a human body.

26. The method of claim 19, further comprising tracking the object to generate performance information of the object.

27. The method of claim 26, wherein the performance information comprises at least one of racing route, lap times or speed information.

28. A computer program product for wireless communication comprising:
    a computer-readable storage medium comprising instructions executable for:
    receiving ranging information from at least one of one or more sensors arranged with an object and one or more sensors remote from the object, wherein the at least one or more sensors arranged with the object and the one or more sensors remote from the object provide the ranging information by defining a proximity sensor mesh; and
    tracking the object with respect to the one or more sensors remote from the object based on the ranging information.

29. The computer program product of claim 28, wherein the instructions are further executable to track the object the one or more sensors remote from the object are affixed to one or more surfaces.

30. The computer program product of claim 29, wherein at least one of the one or more surfaces is portable.

31. The computer program product of claim 28, wherein the one or more sensors remote from the object are affixed to one or more surfaces, and the instructions executable for tracking the object are further executable to track the object by determining one or more positions of the object with respect to the one or more surfaces.

32. The computer program product of claim 28, wherein the object comprises a human body.

33. The computer program product of claim 32, wherein the one or more sensors arranged with the object are affixed to different parts of the human body, and the instructions executable for receiving the ranging information are further executable to determine movement of the different parts of the human body from the ranging information.

34. The computer program product of claim 28, wherein the object comprises a peripheral held or attached to a human body.

35. The computer program product of claim 28, wherein the instructions are further executable to track the object to generate performance information of the object.

36. The computer program product of claim 35, wherein the performance information comprises at least one of racing route, lap times or speed information.

37. A gaming system comprising:
   an antenna; and
   a processing system configured to:
   receive ranging information via the antenna from at least one of one or more sensors arranged with an object and one or more sensors remote from the object, wherein the at least one or more sensors arranged with the object and the one or more sensors remote from the object provide the ranging information by defining a proximity sensor mesh; and
   track the object with respect to the one or more sensors remote from the object based on the ranging information.

* * * * *